United States Patent [19]

Masters et al.

[11] 4,408,983
[45] Oct. 11, 1983

[54] RECUPERATIVE BURNERS

[75] Inventors: Jeffrey Masters; Manjit S. Saimbi, both of Solihull; Roger J. Webb, Redditch, all of England

[73] Assignee: British Gas Corporation, London, England

[21] Appl. No.: 222,753

[22] Filed: Jan. 5, 1981

[30] Foreign Application Priority Data

Aug. 29, 1980 [GB] United Kingdom ............... 8027970

[51] Int. Cl.³ .................................... F23D 11/44
[52] U.S. Cl. .................................. 431/116; 431/215
[58] Field of Search ............... 431/115, 116, 215, 154

[56] References Cited

U.S. PATENT DOCUMENTS

| 2,857,961 | 10/1958 | Brown | 431/116 |
| 3,174,526 | 3/1965 | Von Linde | 431/116 |
| 3,269,448 | 8/1966 | Martin | 431/116 |
| 3,695,816 | 10/1972 | Oeppen | 431/215 |
| 3,705,784 | 12/1972 | Reichhelm | 431/116 |
| 3,826,083 | 7/1974 | Brandon | 431/116 |
| 3,869,244 | 3/1975 | Von Linde | 431/116 |
| 4,230,445 | 10/1980 | Janssen | 431/116 |
| 4,255,122 | 3/1981 | Alpkvist | 431/215 |

FOREIGN PATENT DOCUMENTS

| 52-18233 | 10/1977 | Japan | 431/116 |
| 1140449 | 1/1969 | United Kingdom | 431/116 |

*Primary Examiner*—Daniel J. O'Connor
*Attorney, Agent, or Firm*—Larson and Taylor

[57] ABSTRACT

The invention is a recuperative burner, with heat exchange between the exhausting combustion products and incoming combustion air to the burner nozzle, in which the recuperator essentially comprises separable components of conical shape. The advantages are ease of dismantling, even if the conical components have distorted in use; improved flexibility of design, resulting in better efficiency and reduced formation of nitrogen oxides; and lower costs for both manufacture and maintenance.

13 Claims, 1 Drawing Figure

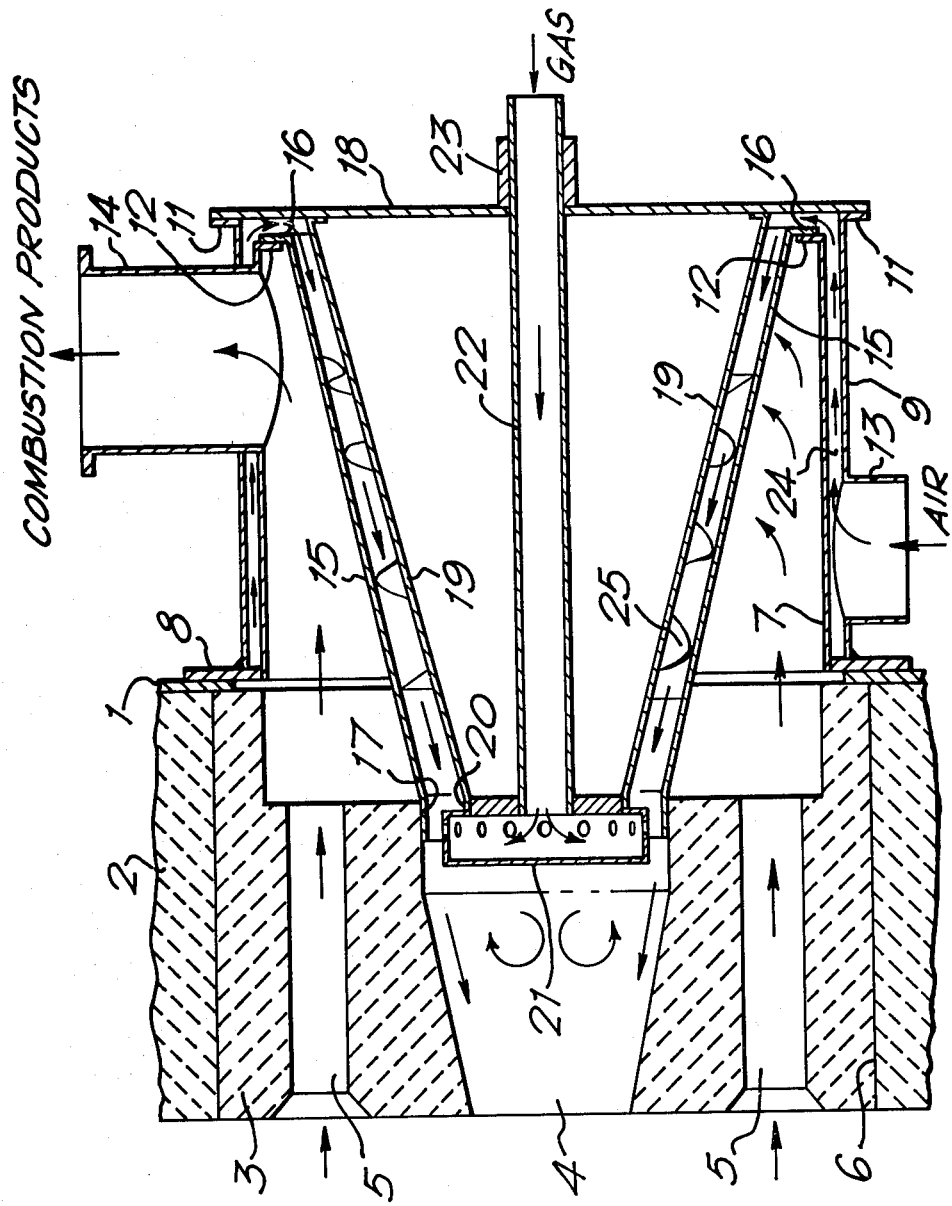

RECUPERATIVE BURNERS

This invention relates to recuperative burners for use in fuel-fired industrial furnaces, heat treatment furnaces and similar appliances of the kind wherein, in use, fuel and combustion air are delivered separately by way of passages to a mixing nozzle or respective fuel and air nozzles directed into a combustion chamber where the fuel and air are ignited and which opens into a space for products of combustion, there being a combustion products passage for conducting products of combustion from the space to the exterior of the furnace, and the combustion air passage of the burner being disposed in use in heat-exchange relationship with the products passage to constitute a recuperator in which products of combustion indirectly preheat the combustion air passing along the air passage. Such recuperative burners are hereinafter referred to as being "of the kind described".

Recuperative burners, for example, of the kind disclosed in British Pat. No. 1,331,427, have been exploited in recent years in a wide variety of applications. Their main advantage is the substantial reduction in fuel costs that results when heat that would otherwise be wasted is extracted from the combustion products and used to preheat the incoming air. Compactness is another attractive feature of such burners. Experience has shown, however, that the elaborate tubular construction of the recuperator, though effective, is expensive to manufacture and more troublesome than is desirable to maintain. In some applications, distortion of the tubes occurs during use so that dismantling is difficult and re-assembly impossible without extensive replacement of components.

An object of the invention is to simplify the construction of recuperative burners in a way that reduced costs, facilitates maintenance and retains the advantages of thermal efficiency and compactness.

Accordingly, the invention provides a recuperative burner of the kind described in which part of the length of the combustion air passage in heat-exchange relationship with the products of combustion may be formed as a truncated substantially conical annular space which converges towards the burner nozzle.

Preferably, the conical annular space is defined between a detachable outer conical tube and an inner conical tube which is detachably supported within the outer conical tube by support means.

The remaining part of the length of the combustion air passage may be formed as a substantially cylindrical annular space which is arranged to be in communication with the conical annular space and with an air inlet. Conveniently, the cylindrical annular space can be defined between outer and inner substantially cylindrical tubes of a detachable assembly.

Then the combustion products passage will be provided by an annular space between the outer conical tube and the inner cylindrical tube, and will communicate with a flue outlet therefrom.

One embodiment of the invention will now be further described, by way of example, with reference to the single FIGURE of the accompanying drawing which is a longitudinal sectional elevation.

Referring to the drawing, the wall of a furnace in which the burner is mounted is formed as an outer metal skin 1 and an inner refractory lining 2. A refractory quarl block 3, having a central combustion chamber 4 and combustion products passageways 5, is supported within an aperture in the refractory lining 2 of the furnace wall. A cylindrical recuperator chamber 7 is detachably secured to the outer metal skin of the furnace wall by its inner flange 8 to which is attached a cylindrical outer sleeve 9 having an outer flange 11. The recuperator chamber 7 has an outer flange 12. An inlet 13 for combustion air is provided in the outer sleeve 9, and an exit 14 for combustion products passes through the outer sleeve to communicate with the recuperator chamber. The combustion products side of the recuperator is completed by an outer conical recuperator tube 15 attached to the flange 12 of the recuperator chamber 7 by its flange 16 and supported within the combustion chamber 4 at 17. A backplate 18 carries an inner conical recuperator tube 19 and is attached to the flange 11 of the outer sleeve 9 and to a rear part 20 of a burner nozzle 21. Fuel gas is supplied to the nozzle 21 through a central tube 22 which is supported through a boss 23 in the backplate 18. Ancillary equipment. e.g., for ignition and flame detection is incorporated but not shown.

When the burner is in use, combustion products flow from the furnace through passageway 5 into the recuperator chamber 7 which they leave through exit 14. Combustion air, driven by a fan (not shown), enters the burner at inlet 13 and passes through the passageway 24 between the wall of recuperator chamber 7 and sleeve 9 to enter the conical annular space 25 between the outer and inner conical recuperator tubes 15 and 19. Thus, as the combustion air progresses through the passageways 24, 25 into the combustion chamber 4, it is indirectly preheated by heat exchange with the outgoing combustion products.

When the burner is taken out of use for maintenance and has to be dismantled, the whole assembly of tube 19, nozzle 21, fuel tube 22, mounted on flange 18 is first detached from the flange 11 and withdrawn. The conical construction, which ensures that tubes 15 and 19 cannot interlock, even though they may have distorted, makes this operation quite straightforward. The conical recuperator tube 15 is then detached from the flange 12 and withdrawn. It readily disengages from the quarl block 3 because there is no mechanical seal at 17 and consequently no fastenings have to be freed which have been in service in the hottest part of the recuperator.

In comparison with known recuperative burners in which the recuperator is constructed from concentric, parallel-sided tubes, the present invention has several advantages. Ease of maintenance is one and it arises not merely because the several components are separable but also because they can readily be disengaged. In known recuperative burners, distorted tubes can lock together so that it becomes necessary to cut through them before they can be withdrawn one from another. They cannot then be reassembled and must be replaced. The conical construction of the main part of the recuperator in accordance with the present invention eliminates the possibility of interlocking and in consequence the components, though they may have distorted, can more often be refurbished and re-used. Only severely damaged components need be replaced. Disengagement of the conical recuperator tube 15 from the quarl block 3 at 17, also, is straightforward because it is no longer necessary to provide a mechanical seal at the end of the combustion air passageway 25 to prevent leakage of air into the combustion products passageway 4. Instead, the low pressure region created around the nozzle 21 by the air flow into the combustion chamber 4 is made use of to ensure that leakage is always from the combustion products passageway 5 into the air passageway 25. Leakage in this direction is acceptable and can even be desirable in some applications. Moreover, because the inner structure of the recuperator now has to support less weight it is less likely to distort.

As well as ease of maintenance, the invention has the advantage of improved design flexibility, resulting in the main frame the introduction of conically fitting components. The cone angle of the outer conical recuperator tube 15 may be varied to influence the proportion of heat exchanged between the combustion products and incoming combustion air that is transferred by radiation. Furthermore, a different cone angle may be used for the inner conical recuperator tube 19 to progressively alter the cross-sectional area of the annular space and influence the velocity of the air flow. The greater scope that these variations afford enables the designer to optimise the amount of air preheat for a specific application of the invention and to exercise some control over the distribution of heat transfer within the recuperator and hence over surface temperatures. This will be of particular benefit in applications to processes operating at temperatures below 1200° C. where heat recovery will be significantly increased, thus giving greater fuel savings. Manufacturing tolerances could be reduced, in some applications, by incorporating a helical guide, indicated at 26, into the combustion air passageway, which effectively increases the flow path for air through the recuperator and allows the passageway to be increased in size without losing air preheat or producing excessively high surface temperatures.

The absence of a mechanical seal at the combustion chamber inlet is another feature that contributes to design flexibility. When necessary, this part of the burner may easily be modified so that, rather than minimising leakage of combustion products into the combustion air, some degree of products recirculation is allowed. Thus, by simple means, a reduction in flame temperature sufficient to give a substantial decrease in the formation of nitrogen oxides may be achieved.

Finally, there are cost advantages. Manufacturing costs are considerably reduced by the simplified construction whilst running costs are reduced by the lower fan power requirements resulting from smaller pressure losses in both the combustion air and combustion products passageways. Maintenance becomes less costly because procedures are simplified and component life is increased.

We claim:

1. In a recuperative burner of the kind wherein, in use, fuel and combustion air are delivered separately by way of passages to a burner nozzle assembly in the form of a mixing nozzle or respective fuel and air nozzles which opens into a space for products of combustion, there being a combustion products passage for conducting products of combustion from the space to the exterior of the furnace, and the combustion air passage of the burner being disposed in use in heat-exchange relationship with the products passage to constitute a recuperator in which products of combustion indirectly preheat the combustion air passing along the air passage, the improvement wherein part of the length of the combustion air passage in heat-exchange relationship with the products of combustion is formed as a truncated substantially conical annular space which converges towards the burner nozzle assembly and wherein the remaining part of the length of the combustion air passage is formed as a substantially cylindrical annular space surrounding said conical annular space communicating with said conical annular space and with an air inlet.

2. A recuperative burner according to claim 1, wherein the conical annular space is defined between a detachable outer conical tube and an inner conical tube which is detachably supported within the outer conical tube by support means.

3. A recuperative burner according to claim 2, wherein the cylindrical annular space is defined between outer and inner substantially cylindrical tubes of a detachable assembly.

4. A recuperative burner according to claim 3, wherein the combustion products passage is formed as an annular space defined between said outer conical tube and said inner cylindrical tube, and which communicates with a flue outlet.

5. A recuperative burner according to claim 2, wherein the burner nozzle assembly and a fuel supply pipe therefor are detachably supported at least by a support means.

6. A recuperative burner according to claim 5, including a burner quarl of refractory material having a central combustion chamber and a plurality of exit apertures for the passage of waste products, the arrangement being such that, in use of the burner, the quarl is arranged to be detachably supported in an aperture in a furnace wall, and wherein an assembly of said outer and inner cylindrical tubes with an associated air inlet and flue outlet forming said cylindrical annular space, said inner and outer conical tubes, and said support means supporting said burner nozzle and fuel supply pipe, is attached to the exterior wall of the furnace and in alignment with the quarl so that said annular combustion products passage communicates with said products-exit-apertures and said combustion air passage and said burner nozzle communicates with said combustion-chamber.

7. A recuperative burner according to claim 6, wherein the outer conical tube is detachably secured at its larger diameter end to an end of said inner cylindrical tube, and is supported at its smaller diameter end by engagement with the quarl at the entrance of its combustion chamber.

8. A recuperative burner according to claim 7 wherein, in operation thereof, a relatively low pressure region created around the nozzle by the flow of combustion air into the combustion chamber is made use of to ensure that any gas leakage between the smaller diameter end of the outer conical tube and its point of engagement with the combustion chamber of the quarl is in the direction from the combustion products passage into the combustion air passage.

9. A recuperative burner according to claim 5, wherein said support means comprises an end closure plate which is detachably secured to an end of said outer cylindrical tube.

10. A recuperative burner according to claim 2, wherein the cone angle of said outer conical tube can be varied for selectively influencing the proportion of heat exchanged between the outgoing combustion products and incoming combustion air.

11. A recuperative burner according to claim 1, wherein the cross-sectional area of said conical annular space is constant.

12. A recuperative burner according to claim 1, wherein means are provided in at least part of the whole length of said combustion air passage to cause air flowing therethrough to take a spiralling path.

13. A recuperative burner according to claim 1, wherein the cross-sectional area of said annular space varies along the length thereof.

* * * * *